United States Patent [19]

Bernhardt et al.

[11] 3,972,847
[45] Aug. 3, 1976

[54] PROCESS FOR MAKING CROSS-LINKING SHAPED ARTICLES FROM COPOLYMERS OF VINYL CHLORIDE

[75] Inventors: Günther Bernhardt, Hangelar; Werner Trautvetter, Troisdorf-Spich, Germany

[73] Assignee: Dynamit Nobel Aktiengesellschaft, Cologne, Germany

[22] Filed: Nov. 3, 1972

[21] Appl. No.: 303,561

[30] Foreign Application Priority Data
Nov. 9, 1971 Germany............................ 2155560

[52] U.S. Cl..................... 260/30.6 R; 260/31.8 R; 260/31.8 B; 264/236; 264/331; 526/14; 526/15; 526/50; 526/57; 526/56; 526/321; 528/502
[51] Int. Cl.² .................. C08F 214/06; C08K 5/12; C08K 5/53
[58] Field of Search....... 260/78.5 CL, 86.3, 31.8 R, 260/87.5 G, 80.76, 80.81, 30.6, 31.8 B; 264/236, 331

[56] References Cited
UNITED STATES PATENTS

| 3,188,305 | 6/1965 | Safford .......................... 260/86.3 X |
| 3,558,566 | 1/1971 | Balwe et al. ........................ 260/78.5 |

*Primary Examiner*—Allan Lieberman
*Attorney, Agent, or Firm*—Burgess, Dinklage & Sprung

[57] ABSTRACT

Vinyl chloride copolymers of vinyl chloride and a comonomer of the formula

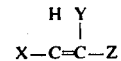

wherein Z contains an alkenyl group and X and Y are H or other substituents. The copolymers can be cross linked to form shaped articles of improved elongation and tenacity.

11 Claims, No Drawings

PROCESS FOR MAKING CROSS-LINKING SHAPED ARTICLES FROM COPOLYMERS OF VINYL CHLORIDE

BACKGROUND

Copolymers of vinyl chloride with fumaric acid esters, maleic acid esters, itaconic acid esters, acrylic acid esters, methacrylic acid esters, vinyl esters and vinyl ethers with saturated an unsaturated alkyl radicals are known. See, for example, H. Kainer 1965, pp.89–109 and Belgian Pat. No. 724,889.

It is furthermore known that an increasing internal plasticization is associated with an increase in the content of these comonomers in the copolymer, especially when they bear long alkyl chains; see, for example, W. S. Port et al., Ind. Eng. Chem 1955, p. 472. It is furthermore known that, if the external or internal plasticization is sufficiently high, copolymers of vinyl chloride display elastic properties; see, for example, German Offenlegungschrift No. 1,902,455. Products made from elastic copolymers of vinyl chloride, however, have the decided disadvantage that, as the content of external or internal plasticizer increases, tenacity decreases drastically, and solubility or swelling in many organic solvents increases.

These disadvantages render the products unusable for many applications in which high tenacity combined with high elongation is expected, or resistance to oils, gasoline or solvents is required. The cross-linking of vinyl polymers, where the cross-linking densities are low, has resulted in naught but a diminution of these disadvantages. Attempts have been made to increase the cross-linking density by adding additional polymers containing unsaturated groups, for example, polymers of diolefins, but this has necessarily resulted in a reduction of the percentage of the longer chain alkyl groups which bring about the internal plasticization.

THE INVENTION

Surprisingly, it has now been found possible in accordance with the invention to improve substantially the properties of products made from the above-named copolymers.

The subject of the present invention is cross-linked, resilient articles consisting substantially of cross linked copolymers of 30 to 98% vinyl chloride, preferably 50–95% and 2 to 70%, preferably 5–50%, by weight, of one or more unsaturated comonomers of the general formula:

wherein
a. X and Z = —COOR and Y = H or —CH$_3$,
b. X = H or —CH$_3$, Y = H, —CH$_3$ or —CH$_2$—COOR, and Z = —COOR' or —CH$_2$COOR,
c. X = H, Y = H or —CH$_3$, and Z = —OR or —CH$_2$OR
d. X and Y = H, and Z = —OCOR, or
e. X = H, Y = H or CH$_3$, and Z = —CH$_2$—OCOR'
and R represents an alkenyl group (an ethylenically unsaturated aliphatic, especially hydrocarbon radical) or, in some cases, poly-ethylenically unsaturated alkyl group with 3 to 26 carbon atoms, or R', where it occurs, is the same as R except with 4 to about 26 carbon atoms.

In these polymers, from 0 to 98 wt.%, preferably 0 to 85 wt.%, of the unsaturated alkenyl comonomer may be replaced with unsaturated alkyl comonomers of the general formula set forth above but wherein R and R' is each an alkyl of 1–26 carbon atoms. This is to say that the alkenyl and alkyl unsaturated comonomers together are 2 to 70 wt.% of the copolymer, and the alkyl comonomer is 0 to 98 wt.% of the weight of the alkenyl plus alkyl comonomers. Thus the copolymer contains at least 0.04 wt.% of the comonomer wherein R and R' is each alkenyl.

Alkenyl and alkyl include cycloalkenyl and cycloalkyl. Where the cyclic residues are present, the invention particularly comtemplates 5 to 8, preferably 5 to 6 carbon atoms in the cyclic residues.

The articles may be free of external plasticizers or may additionally contain an external plasticizer in the amount of 0.5 to 50% of the weight of the copolymer.

The invention further comtemplates the manufacture of cross linked, resilient articles employing unsaturated comonomers as aforesaid characterized in that the non-cross-linked copolymers are combined with stabilizers, lubricants and, if desired, external plasticizers, pigments and/or fillers, at temperatures of 120° to 170°C, to form a homogenous mixture into which, at 90° to 140°C, cross linking agent, e.g. an organic peroxide and in some cases cross-linking adjuvants, are incorporated. The granules, powder or roll-mixer skin thus obtained can be made into articles in a conventional manner. The articles can then be heated, preferably under pressure, to the starting temperature of the cross linking agent, e.g. a peroxide or slightly higher until the desired cross linking of the copolymers is accomplished.

Copolymers are preferred in which the alkenyl and alkyl groups R and R' contain 4 to 18 carbon atoms, and especially those with 9 to 18 carbon atoms.

The unsaturated comonomer content is to amount preferably to 5 to 50% of the weight of the copolymer. If a percentage of comonomer with a saturated group R is present, it will be preferably from 1 to 85% of the total comonomer weight.

It has been found that it is possible, in accordance with the invention, to achieve a high cross-linking density with simple means, and especially to achieve a high tenacity, although previous experience has shown that hydrocarbon chains of 3 to 26 carbon atoms greatly reduce tenacity. On the other hand, the internal plasticizing action of the comonomers having a long-chained group R, in spite of the cross linking that occurs in part at the olefin bond, is so great that external plasticizers may be dispersed with in numerous applications. Due to the internal plasticization and to cross linking through the alkenyl groups of the unsaturated comonomers, and also in some cases to relatively low external plasticizer contents, rubber-elastic products can be obtained having a high tenacity and elongation at failure combined with minimal solubility in solvents and very little swellability. For certain applications the percentage of comonomers which provide internal plasticization may therefore amount to as much as 70% of the copolymer, by weight.

Advantages of these cross linked molding compounds are: High resistance to deformation under stress, suppression of creep at elevated temperature, and improved resistance to wear. On the other hand, the un-cross-linked copolymers of the invention and thermoplastic molding compounds made therefrom are characterized by easy workability and fast, controlled cross-linking ability. Furthermore, since their softness is not based, or not exclusively based, on external plasticization, there is little or no danger of embrittlement of the products due to plasticizer losses resulting from sweating or evaporation or especially from extraction, as for example by the action of organic solvents. Even though cross-linking can be accomplished with a great deal of external plasticizing, nevertheless a great amount of bubbling is produced in the molding during the cross linking process as a result of the volatile components liberated by peroxide decomposition, and this greatly impairs tenacity and elongation at failure. If the plasticization is mainly internal, the danger of bubbling is substantially or entirely eliminated.

Additional advantages of the above-named cross-linking molding compounds are that the cross linking can be controlled by temperature, heating time, peroxide content and, additionally, by other cross linking adjuvants, in such a manner that the desired elastic properties of the products are achieved. This signifies that it is possible to achieve precisely that cross linking density which makes possible a high tenacity combined with high elongation. At the same time the tendency to swell in organic solvents may be kept low. It is also possible by the appropriate selection or by using the appropriate quantity of the internal plasticizer to arrive at hard elastic or hard products without changing the cross linking conditions.

In general, the internal plasticizing action occurs only with those comonomers which have an overall chain length of six and more carbon atoms. If, however, the portion X — CH = C (Y) — of the formula already has a chain length of 4, 5 or more carbon atoms, the alkenyl group making up the balance of the comonomer, e.g. a vinyl group or allyl group, may also be short-chained. If, however, the above formula portion and the alkenyl group are shortchained, hard-elastic, highly cross linked and non-swelling articles will result.

In addition to short-chained comonomers of the above-described kind, the polymers may contain other comonomers having long chain alkyl groups R of from about 4 to 6 carbon atoms, the comonomers with short-chained alkenyl or alkyl groups, for example, such as acrylic acid allyl ester or vinyl allyl ether, amounting to only 60% of the total comonomers by weight. The additional, long-chained comonomers will then also aid in the internal plasticization.

The fumaric, maleic and itaconic acid esters of the unsaturated alcohols, especially those of from 4 carbon atoms up, are especially advantageous as unsaturated comonomers.

Comonomers which can be copolymerized with vinyl chloride may be, for example, the following, at least one of the comonomers which contain the alkenyl groups being present, while additional comonomers contaning alkylene groups or alkyl groups may be present:

a. Fumaric acid, maleic acid and mesaconic acid diesters of:
I. Primary alcohols, e.g., propanol, n-butanol, n-octanol, decyl alcohol, lauryl alcohol, myristyl alcohol, cetyl alcohol, stearyl alcohol, eicosanyl alcohol, dihydrophytol, docosanol or carnaubyl alcohol, and mixtures thereof.
II. Secondary alcohols, e.g., sec.-butanol, sec.-amyl alcohol or capryl alcohol.
III. Tertiary alcohols, e.g., tert.-butyl alcohol or tert.-amyl alcohol.
IV. Branched alcohols, e.g., isobutyl alcohol, isoamyl alcohol or neopentyl alcohol.
V. Cyclic alcohols, e.g., cyclohexanol or cyclohexenol.
VI. Unsaturated alcohols, e.g., allyl alcohol, crotyl alcohol, undecenol, tetradecenol, oleyl alcohol, elaidyl alcohol, palmitoleyl alcohol, eicosenol, carnaubenol, hexacosenol or pythol, or einoleyl alcohol.

b. Acrylic acid, methacrylic acid, crotonic acid and vinyl acetic acid esters of the alcohols named under (a)(I) to (a)(VI), or itaconic acid diesters thereof, as the case may be, c. Vinyl, allyl and methallyl ethers of the alcohols named under (a)(I) to (a)(VI), d. Vinyl esters of:
I. Saturated carboxylic acids, e.g., propionic acid, butyric acid, isovaleric acid, capronic acid, caprinic acid, lauric acid, myristic acid, palmitic acid, stearic acid, behenic acid or cerotinic acid, or of the branched carboxylic acids known by the commercial name, "versatic acids,"
II. Unsaturated carboxylic acids, e.g., methacrylic acid, crotonic acid, $\Delta^{9,10}$-dodecylenic acid, $\Delta^{9,10}$-decylenic acid, palmitoleic acid, oleic acid, elaidinic acid, ricinolic acid, erucaic acid or nervonic acid.

e. Allyl and methallyl esters of the acids named under (d)(I) and (d)(II).

With regard to the cross-linking of the above-named copolymers, it matters not whether they are manufactured by the emulsion, suspension or mass polymerization process.

Suitable peroxides for cross linking are especially those whose degradation temperature is higher than 150°C, examples being 1,3-bis-(tert-butylperoxyisopropyl)-benzene, dicumyl peroxide, tert-butylcumyl peroxide, phthalide peroxide, 2,5-bis-(tert.-butylperoxy)-2,5-dimethylhexane or 2,5-bis-(tert.-butylperoxy)-2,5-dimethylhexine-3 and the like.

Preferably 1 to 6 wt-% of peroxide is used, with respect to the copolymer.

Especially high cross linking densities can be achieved through the use of additional cross linking adjuvants. Such cross linking adjuvants are organic compounds having a plurality of reactive double bonds, such as triallyl cyanurate, triallyl isocyanurate, di- and trivinylbenzene, ethylene dimethacrylate, diallyl phthalate and bismaleic imides.

It is advantageous to use from 0.5 to 6 wt-% of the adjuvant, with respect to the copolymer.

The cross linked molding compounds in accordance with the invention may additionally contain percentages of other components which are incorporated for the purpose of adapting the properties of the molding compounds to the particular requirements of their intended use. These are, particularly: external plasticizers, various stabilizers, fillers, lubricants, pigments and dyes.

Additional external plasticizers which, for example, may improve the elasticity of the cross linked molding compounds of the invention, are preferably selected from among the phthalic acid diesters, such as 2-ethylhexylphthalate and dodecylphthalate the esters of adipic acid, azelaic acid, sebacic acid and citric acid such as octyl sebacate or octyl adipate, and the esters of trimellitic acid and phosphoric acid, such as triaryl and trialkyl phosphates, generally those having more than six carbon atoms in the alcohol radical.

The stabilizers added to the cross linked molding compounds of the invention are, for example, lead salts, especially phthalates and basic lead compounds of inorganic acids, barium and cadmium salts of fatty acids and, in some cases, thermostabilizers which do not produce discoloration, such as diane, styrolized phenol, 2,2,4-trimethyl-1,2-dihydroquinoline, or the like.

The preparation of the molding compounds of the invention is best performed in two process steps, and may be carried out by providing the copolymers with the necessary additives, such as plasticizers, stabilizers, lubricants and, if desired, pigments, and working them on the roll or in a roll mixer, at temperatures of 120° to 170°C, preferably 130° to 160°C, into a homogeneous, plastic mass. Then the roll temperature is lowered to 90° to 140°C, preferably 120° to 140°C, and the peroxide, together with additional cross linking adjuvants if desired, is uniformly distributed through the plastic mass. The roll skin thus obtained is then granulated or directly worked into pressed sheets, for example.

The fabrication of the molding compounds of the invention into shaped articles is performed below 140°C. The cross linking of the shaped articles is then brought about by raising the temperature to 150° to 180°C, preferably 160° to 170°C, preferably with the simultaneous application of pressure.

The cross linking reaction may last from 5 to 30 minutes, but is generally complete within 5 to 15 minutes.

The preparation of the molding compounds of the invention may also be performed in the fluid mixer by mixing the copolymers with the required additives, such as plasticizers, stabilizers, lubricants and, if desired, pigments, and working them into a premix at temperatures up to 160°C, preferably between 120° and 160°C. The mixer content is then cooled down to 120° to 140°, preferably 120° to 130°C, and then the peroxide, and the cross linking adjuvant if used, are added, and are uniformly distributed with the mixing roll running slowly.

In this manner a free-flowing dry blend powder may be obtained, which can then be fabricated by injection molding or extrusion methods, in accordance with the fabrication and cross linking conditions given above.

In general, any process may be used which first produces a homogeneous, formable and non-cross-linked or not substantially cross linked, thermoplastic molding compound and permits the production therefrom of the final product after addition of the peroxides in the same or a separate procedure, with simultaneous or subsequent cross linking.

In the following examples, RF in the table represents the tenacity from the German [Reissfestigkeit], RD the elongation at failure from the German [Reissdehnung] (in accordance with DIN 53371), Q the swelling, and G the gel content.

The quantities given in the first four columns of the tables refer to parts by weight. Examples of un-cross linked specimens, which are given for purposes of comparison, can be recognized in the following tables by the absence of contents of peroxide and cross linking adjuvants (columns 3 and 4), and in comparison with specimens of otherwise the same composition they have poor tenacity and elongation together with complete swelling in solvents.

Tetrahydrofuran was selected as the test solvent for swelling and dissolving experiments, since it has a strong swelling action and easily dissolves non-cross linked VC copolymers.

Since insolubility occurs as a consequence of cross linked macromolecules, solvents which easily dissolve the copolymers in the non-cross linked state produce only a comparatively slight swelling of the cross linked article, without substantially changing its shape.

In the examples, the percentages of swelling and the percentage of gel were determined as follows:

At various points on the pressed plates, specimens were taken, totalling about 1 g, and they were boiled for 2 hours in 100 ccm of boiling tetrahydrofuran. The swollen specimens were removed from the solution, freed of solvent adhering to the surface by blotting, and weighed; then they were dried in vacuo for 4 hours at 70°C and weighed again.

The initial weight and the weights in the swollen and dried state were corrected in each case to 100% polymer (on account of the non-polymeric components contained in the specimen) and from these values the percentage of swelling and the percentage of gel were computed on the basis of the following formulas:

$$\frac{\text{Corrected weight swollen - corrected weight dry}}{\text{Corrected weight dry}} \times 100 = \% \text{ of swelling}$$

and $$\frac{\text{corrected weight dry}}{\text{corrected initial weight}} \times 100 = \% \text{ of gel}$$

EXAMPLE 1

18 parts of a commercial emulsifier, e.g., the sodium salt of a paraffin sulfonic acid with 12 to 14 carbon atoms in the alkyl group, are dissolved with 3.6 parts of potassium persulfate and 16.5 parts of disodium phosphate in 520 parts of desalted water. This solution is combined with 200 parts of dibutyl maleinate and 36 parts of dioleyl maleinate in a 2-liter autoclave with stirrer. The air is purged from the autoclave with nitrogen. Then 540 parts of vinyl chloride is put in. After the stirrer is started the autoclave is heated to 50°C. After 18 hours the polymerization is discontinued. The pressure in the autoclave has by then failed from an initial 7.0 atmospheres to 1.9 atmospheres gauge.

The latex that has formed is precipitated with dilute aluminum sulfate solution, washed sulfate-free with water, and dried. The product has a K value of 65.

According to Table 1, ten specimens of the copolymer obtained are plasticized with various percentages of dioctylphthalate (DOP) plus 7 parts each of lead phthalate and 1 part of neutral lead stearate (with reference to 100 parts of copolymer) on a two-roll mixer at 140°–160°C (10 minutes).

After the rolls have cooled to 120°–130°C, the quantities listed in Table 1 under a to k of 1,3-bis-(tert.-butylperoxyisopropyl)-benzene and triallylcyanurate (TAC) are uniformly distributed through the plastic mass, and pressed plates are prepared from the roll skins at the stated temperatures in accordance with the stated pressing times. The press pressure amounts in each case to 45 to 50 kg/cm$^2$.

TABLE 1

| Copolymer | DOP | Peroxide | TAC | Temp. °C | Pressing time (min) | RF (kp/cm²) | RD % | %Q | %G |
|---|---|---|---|---|---|---|---|---|---|
| a) 100 | 11.2 | 0 | 0 | 160 | 10 | 110 | 350 | ∞ | 0 |
| b) 100 | 11.2 | 0 | 0 | 160 | 10 | 140 | 355 | 550 | 90 |
| c) 100 | 11.2 | 3 | 3 | 160 | 10 | 185 | 270 | 280 | 92 |
| d) 100 | 11.2 | 3 | 3 | 170 | 5 | 200 | 209 | 210 | 95 |
| e) 100 | 25.0 | 0 | 0 | 160 | 10 | 60 | 403 | ∞ | 0 |
| f) 100 | 25.0 | 3 | 0 | 160 | 10 | 101 | 385 | 680 | 87 |
| g) 100 | 25.0 | 3 | 3 | 170 | 5 | 150 | 320 | 480 | 93 |
| h) 100 | 11.2 | 1.5 | 0 | 160 | 10 | 123 | 360 | 820 | 86 |
| i) 100 | 11.2 | 1.5 | 0 | 160 | 15 | 135 | 350 | 570 | 90 |
| k) 100 | 0.0 | 3 | 3 | 160 | 10 | 220 | 195 | 150 | 101 |

EXAMPLE 2

The copolymerization of Example 1 is modified so that, instead of dibutyl maleinate and dioleyl maleinate, a 5:1 mixture of di-2-ethylhexyl itaconate and di-elaidyl itaconate is copolymerized and its percentage in the copolymer amounts to 25%. A K value of 65 is measured.

In accordance with Table 2, 5 specimens of the copolymer, containing various amounts of tricresyl phosphate (TCP) plus 5 parts in each specimen of basic lead sulfate (with reference to 100 parts of copolymer) are plasticized on a two-roll mixer between 140° and 160°C (10 minutes). After the rolls have cooled to 120° to 130°C, the amounts of dicumyl peroxide (DICUP) and ethylene-bis-maleimide (EBMI) which are stated in Table 2 under a) to e) are uniformly mixed into the plastic mass, and pressed plates are prepared from the roll skins by the procedure of Example 1 and subjected to the above-stated tests.

TABLE 2

| Copolymer | TKP | DICUP | EBMI | Temp. °C | Pressing time (min) | RF (kp/cm²) | RD | %Q | %G |
|---|---|---|---|---|---|---|---|---|---|
| a) 100 | 17.7 | 0 | 0 | 160 | 10 | 105 | 360 | ∞ | 0 |
| b) 100 | 17.7 | 3 | 0 | 160 | 10 | 142 | 385 | 530 | 91 |
| c) 100 | 17.7 | 3 | 3 | 160 | 10 | 175 | 290 | 270 | 93 |
| d) 100 | 17.7 | 3 | 3 | 170 | 5 | 185 | 215 | 210 | 98 |
| e) 100 | 0.0 | 3 | 3 | 160 | 10 | 230 | 180 | 160 | 105 |

EXAMPLE 3

The copolymerization of Example 1 is modified so that, instead of dibutyl maleinate and dioleyl maleinate, a 1:1 mixture consisting of vinyl laurate and vinyl oleate is copolymerized and its content in the copolymer amounts to 27%. A K value of 62 is measured. As indicated in Table 3,5 specimens of the copolymer thus obtained are plasticized with varying amounts of trialfol-8,10-trimellitate (TATM) and 7 parts of lead phthalate and 1 part of neutral lead stearate (with reference to 100 parts of copolymer) on a two-roll mixer between 140° and 160°C (10 minutes). After the rolls have cooled to 120° to 130°C, the amounts of phthalide peroxide (PHP) and triallyl cyanurate (TAC) which are listed in Table 3 under (a) to (e) are uniformly distributed through the plastic mass and pressed plates are prepared from the roll skins by the procedure described in Example 1 and are subjected to the tests also described in that example.

TABLE 3

| Copolymer | TATM | PHP | TAC | Temp. °C | Pressing time (min) | RF (kp/cm²) | RD | %Q | %G |
|---|---|---|---|---|---|---|---|---|---|
| a) 100 | 11.2 | 0 | 0 | 160 | 10 | 98 | 360 | ∞ | 0 |
| b) 100 | 11.2 | 3 | 0 | 160 | 10 | 156 | 350 | 510 | 89 |
| c) 100 | 11.2 | 3 | 3 | 160 | 10 | 190 | 295 | 260 | 93 |
| d) 100 | 11.2 | 3 | 3 | 170 | 5 | 210 | 230 | 190 | 99 |
| e) 100 | 0.0 | 3 | 3 | 160 | 10 | 250 | 180 | 160 | 110 |

EXAMPLE 4

The copolymerization of Example 1 is modified so that, instead of dibutyl maleinate and dioleyl maleinate, a 5:1 mixture consisting of 2-ethylhexylacrylate and oleyl acrylate is copolymerized and its content in the copolymer amounts to 30%. A K value of 53 is measured.

As indicated in Table 4,5 specimens of the copolymer thus obtained are plasticized with various amounts of didodecyl sebacate (DDS) and 3 parts of dialkyl tin mercaptide (with reference to 100 parts of copolymer) on a two-roll mixer between 140° and 160°C (12 minutes). After the rolls have cooled to 120° to 130°C, the amounts of phthalide peroxide (PHP) and triallyl cyanurate (TAC) which are listed in Table 4 under (a) to (e) are distributed through the plastic mass and pressed plates are prepared from the roll skins in the manner described in Example 1, and subjected to the tests also described therein.

TABLE 4

| Copolymer | DDS | PHP | TAC | Temp. | Pressing time (min) | RF (kp/cm²) | RD (%) | %Q | %G |
|---|---|---|---|---|---|---|---|---|---|
| a) 100 | 17.7 | 0 | 0 | 160 | 10 | 115 | 365 | ∞ | 0 |
| b) 100 | 17.7 | 3 | 0 | 160 | 10 | 150 | 370 | 520 | 91 |
| c) 100 | 17.3 | 3 | 3 | 160 | 10 | 182 | 295 | 285 | 91 |
| d) 100 | 17.7 | 3 | 3 | 170 | 5 | 195 | 220 | 210 | 96 |
| e) 100 | 0.0 | 3 | 3 | 160 | 10 | 239 | 185 | 155 | 100 |

EXAMPLE 5

The copolymerization of Example 1 is modified so that, instead of dibutyl maleinate and dioleyl maleinate a 3:1 mixture consisting of vinyl dodecyl ether and vinyl oleyl ether is copolymerized and its content in the copolymer is 28%. A K value of 57 is measured.

As indicated in Table 5, 5 specimens of the copolymer obtained are plasticized with various amounts of didecyl phthalate (DDHP) plus 7 parts of lead phthalate and 1 part of lead stearate (with reference to 100 parts of copolymer) on a two-roll mixer between 140° and 160°C (8 minutes). After the rolls have cooled to 120° to 130°C, the amounts listed in Table 5 under (a) to (e) of 1,3-bis-(tert.-butylperoxyisopropyl)-benzene and triallyl cyanurate (TAC) are distributed through the plastic mass and pressed plates are prepared from the roll skins as described in Example 1 and subjected to the tests also described therein.

In any of the foregoing Examples, the other comonomers disclosed at page 7, line 1 to page 8, line 13 can be used according to the invention with similar results.

In example 1 the commercial emulsifier has the trade name Marlon A 350, and is a product of Chemische Werke Huls, Marl, W.-Germany. The 1,3-bis-(tert.-butylperoxyisoproyl)-benzene is a product of Oxydo, Emmerich, W.-Germany of the trade name Perkadox 14.

In example 3, trialfol means straight-chain alcohols, here stearylalcohol, produced by Condea GmbH, Brunbuttelkoog, W.-Germany.

In example 6 as phthalide peroxide is named 3-phenyl-3-tert.butylperoxyphthalid of the formula

TABLE 5

| Copolymer | DDPH | Peroxide | TAC | Temp. °C | Pressing time (min) | RF (kp/cm²) | RD | %Q | %G |
|---|---|---|---|---|---|---|---|---|---|
| a) 100 | 15.0 | 0 | 0 | 160 | 10 | 105 | 355 | ∞ | 0 |
| b) 100 | 15.0 | 3 | 0 | 160 | 10 | 145 | 360 | 530 | 92 |
| c) 100 | 15.0 | 3 | 3 | 160 | 10 | 190 | 280 | 260 | 94 |
| d) 100 | 15.0 | 3 | 3 | 170 | 5 | 210 | 205 | 200 | 95 |
| e) 100 | 0.0 | 3 | 3 | 160 | 10 | 240 | 185 | 155 | 103 |

Octane and technical oils greatly swell and partially dissolve the un-cross linked product (a). In the case of the cross linked products (b) to (e) the swelling is negligible.

EXAMPLE 6

In a manner similar to Example 1, but at a polymerization temperature of 40°C, an emulsion polymer was prepared from 0.5 wt-% vinyl allyl ether, 1.0 wt-% vinyl cyclohexyl ether, 16.5 wt-% allyl acrylate ester and 82% vinyl chloride.

The polymer was plasticized together with 7 parts of lead phthalate as in Example 5 and, after incorporation of 3 parts of dicumyl peroxide, was made into a pressed plate.

The product is insoluble and barely swellable in tetrahydrofuran.

EXAMPLE 7

In a manner similar to Example 1 a copolymer was prepared from 10 wt-% acrylic acid allyl ester, 30 wt-% maleic acid dioleyl ester and 60 wt-% VC and made into cross linked products as in Example 5.

The cross linking conditions, peroxide proportions and plasticizer proportions were the same as in Table 5, and the same technical data as listed in Table 5 were obtained.

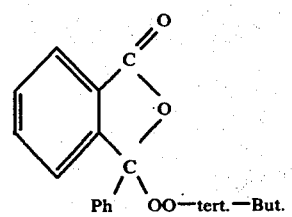

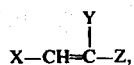

What is claimed is:

1. Process for production of cross linked shaped bodies comprising admixing copolymer of 30 to 98 wt-% vinyl chloride and 2 to 70 wt-% of at least one comonomer of the formula $$X-CH=C-Z,$$
$$\phantom{X-CH=}|\phantom{C-Z}$$
$$\phantom{X-CH=C}Y$$

wherein Z is at least one of —COOR, —COOR', —CH₂COOR, —OR,—CH₂OR, —OCOR and —CH₂OCOR' and a. when
  Z = –COOR,
  X = —COOR, and
  Y = –H or —CH₃
b. when
  Z = —COOR' or —CH₂COOR X = —H or —CH$_3$, and
Y = —H or —CH$_3$ or —CH$_2$COOR
c. when
Z = —OR or —CH$_2$OR
X = —H, and
Y = —H or —CH$_3$
d. when
Z = —OCOR,
X = —H, and
Y = —H
e. when
Z = —CH$_2$OCOR',
X = —H, and
Y = —H or —CH$_3$
and R represents at least monoethylenic alkenyl of 3 to 26 carbon atoms or alkyl of 1–26 carbon atoms, and R' represents at least monoethylenic alkenyl of 4 to 26 carbon atoms or alkyl of 1–26 carbon atoms, with the proviso that the copolymer contains at least 0.04 wt.% of the comonomer wherein R and R' is each alkenyl, with at least one of stabilizers, and external plasticizers at 120°–170°C, adding an organic peroxide cross linking agent to the resulting admixture at 90°–140°C, forming the admixture containing cross linking agent into a shaped body, and heating the shaped body for cross linking of the copolymer.

2. Process of claim 1, wherein X and Z = —COOR and Y = —H or —CH$_3$.

3. Process of claim 1, wherein X = —H or —CH$_3$, Y = —H, —CH$_3$ or —CH$_2$COOR, and Z = —COOR' or —CH$_2$COOR.

4. Process of claim 1, wherein X = —H, Y = —H or —CH$_3$, and Z = —OR or —CH$_2$OR.

5. Process of claim 1, wherein X and Y = —H, and Z = —OCOR.

6. Process of claim 1, wherein X = —H, Y = —H or —CH$_3$, and Z = —CH$_3$OCOR'.

7. Process of claim 1, wherein an external plasticizer is mixed with the copolymer, the amount of plasticizer being 0.5 to 50 wt.% of the copolymer.

8. Process of claim 1, said comonomer comprising
   1. dioleyl maleinate and dibutyl maleinate,
   2. di-elaidyl itaconate, and di-2-ethyl hexyl itaconate,
   3. vinyl oleate, and vinyl laurate,
   4. oleyl acrylate, and 2-ethyl hexyl acrylate,
   5. vinyl oleyl ether, and vinyl dodecyl ether,
   6. vinyl allylether, allyl acrylate, and vinyl cyclohexyl ether, or
   7. maleic acid dioleyl ester, and acrylic acid allyl ester.

9. Process of claim 1, and including in the admixture formed into the shaped body, cross linking adjuvant which is an organic compound having a plurality of reactive double bonds.

10. Process of claim 9, wherein the cross linking adjuvant is triallyl cyanurate, triallyl isocyanurate, divinylbenzene, trivinylbenzene, ethylene dimethacrylate, diallyl phthalate and bismaleic imides.

11. Process of claim 9, wherein the amount of the cross linking adjuvant is 0.5–6 wt.% with respect to the copolymer.

* * * * *